United States Patent [19]

Muniz et al.

[11] Patent Number: 5,613,994
[45] Date of Patent: Mar. 25, 1997

[54] ELECTRIC FURNACE FOR MELTING GLASS

[75] Inventors: Jose A. C. Muniz, Madrid; Luis G. Goicoechea, Aviles, both of Spain; Maurice Lemaille, Douai, France

[73] Assignee: Saint-Gobain Vitrage International, Courbevoie, France

[21] Appl. No.: 216,298

[22] Filed: Mar. 23, 1994

[30] Foreign Application Priority Data

Mar. 23, 1993 [FR] France ................... 93 03288

[51] Int. Cl.$^6$ ................ C03B 5/20; C03B 5/02
[52] U.S. Cl. ............... 65/339; 65/340; 65/342; 65/343; 65/346; 65/347; 65/355; 65/374.12; 65/135.8; 373/27
[58] Field of Search .................. 65/135.8, 337, 65/340, 342, 343, 345, 346, 347, 355, 374.12; 373/27

[56] References Cited

U.S. PATENT DOCUMENTS

| | | | |
|---|---|---|---|
| 1,641,898 | 9/1927 | Neenan | 65/337 |
| 2,049,600 | 8/1936 | Wright | 65/337 |
| 2,508,222 | 5/1950 | Cannon . | |
| 2,677,003 | 4/1954 | Arbeit . | |
| 3,137,559 | 6/1964 | Van Praet | 65/343 |
| 3,226,220 | 12/1965 | Plumat | 65/345 |
| 3,976,464 | 8/1976 | Wardlaw | 65/337 |
| 4,317,669 | 3/1982 | Boss et al. | 65/337 |
| 4,349,376 | 9/1982 | Dunn et al. | 65/345 |
| 4,900,337 | 2/1990 | Zortea et al. | 65/345 |

FOREIGN PATENT DOCUMENTS

| | | | |
|---|---|---|---|
| 247178 | 5/1963 | Australia | 65/345 |
| 0304371 | 2/1989 | European Pat. Off. . | |
| 1300588 | 9/1961 | France . | |

Primary Examiner—Donald E. Czaja
Assistant Examiner—Steven P. Griffin
Attorney, Agent, or Firm—Oblon, Spivak, McClelland, Maier & Neustadt, P.C.

[57] ABSTRACT

The device for melting glass includes a compartment 1 for melting with a discharge throat 11 defined on top by a mobile carrier 16 having an upper part 18 extending upward above the level of glass and a lower part 17 intended to be totally immersed in the molten glass. Faces of the lower part are formed of a metal or an alloy of metals resistant to corrosion by the molten glass.

21 Claims, 3 Drawing Sheets

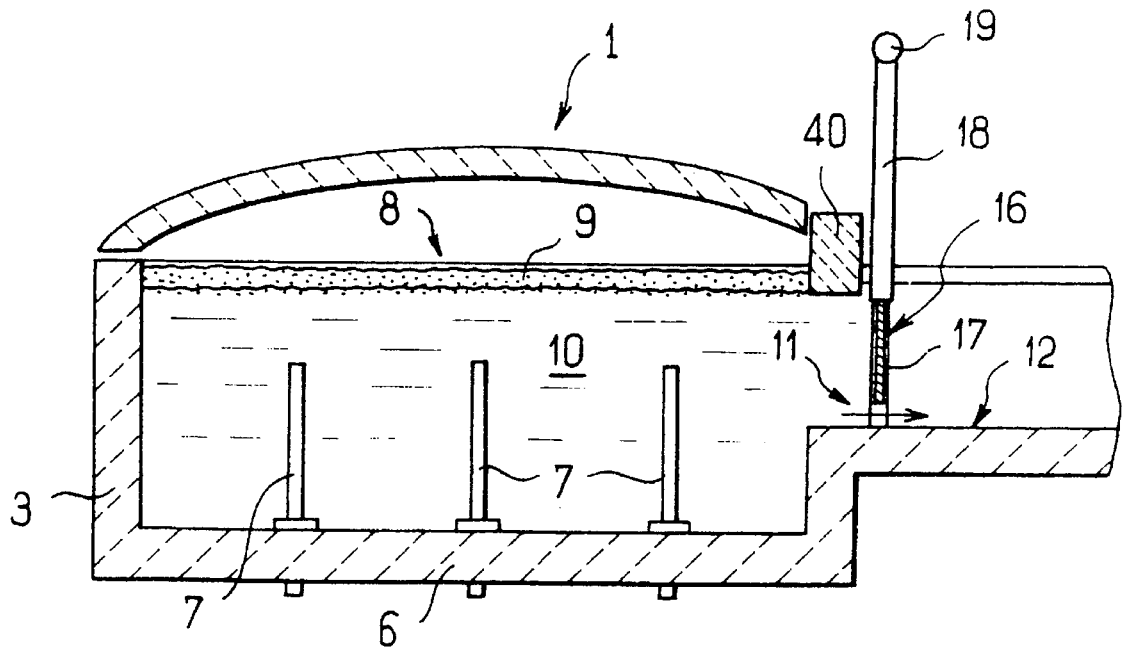
FIG_1
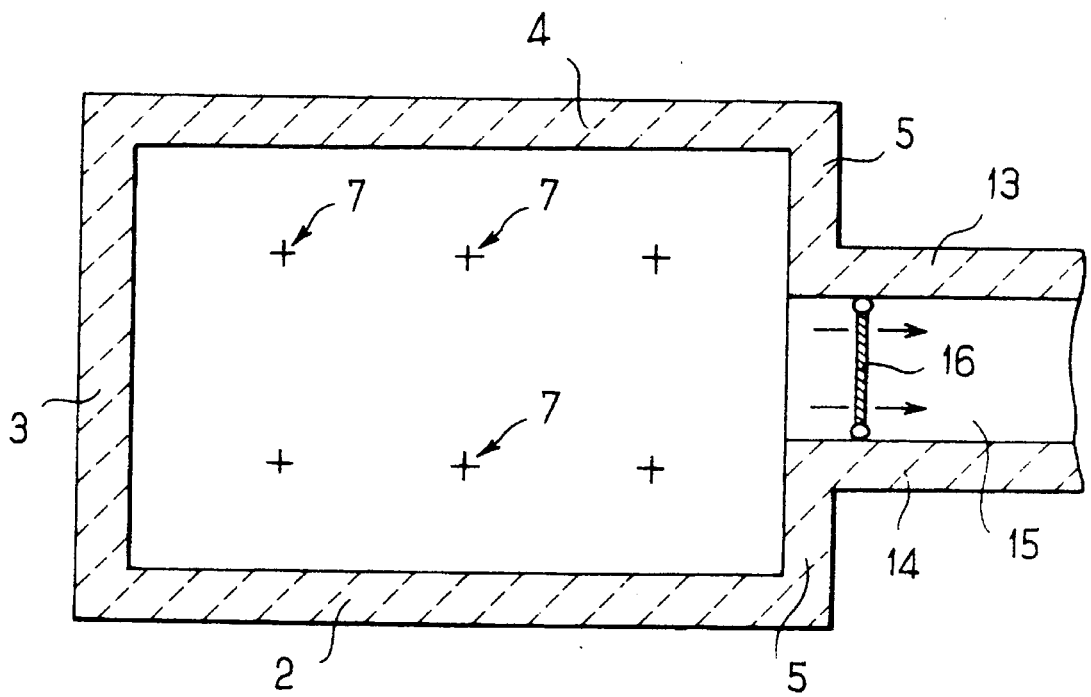
FIG_2

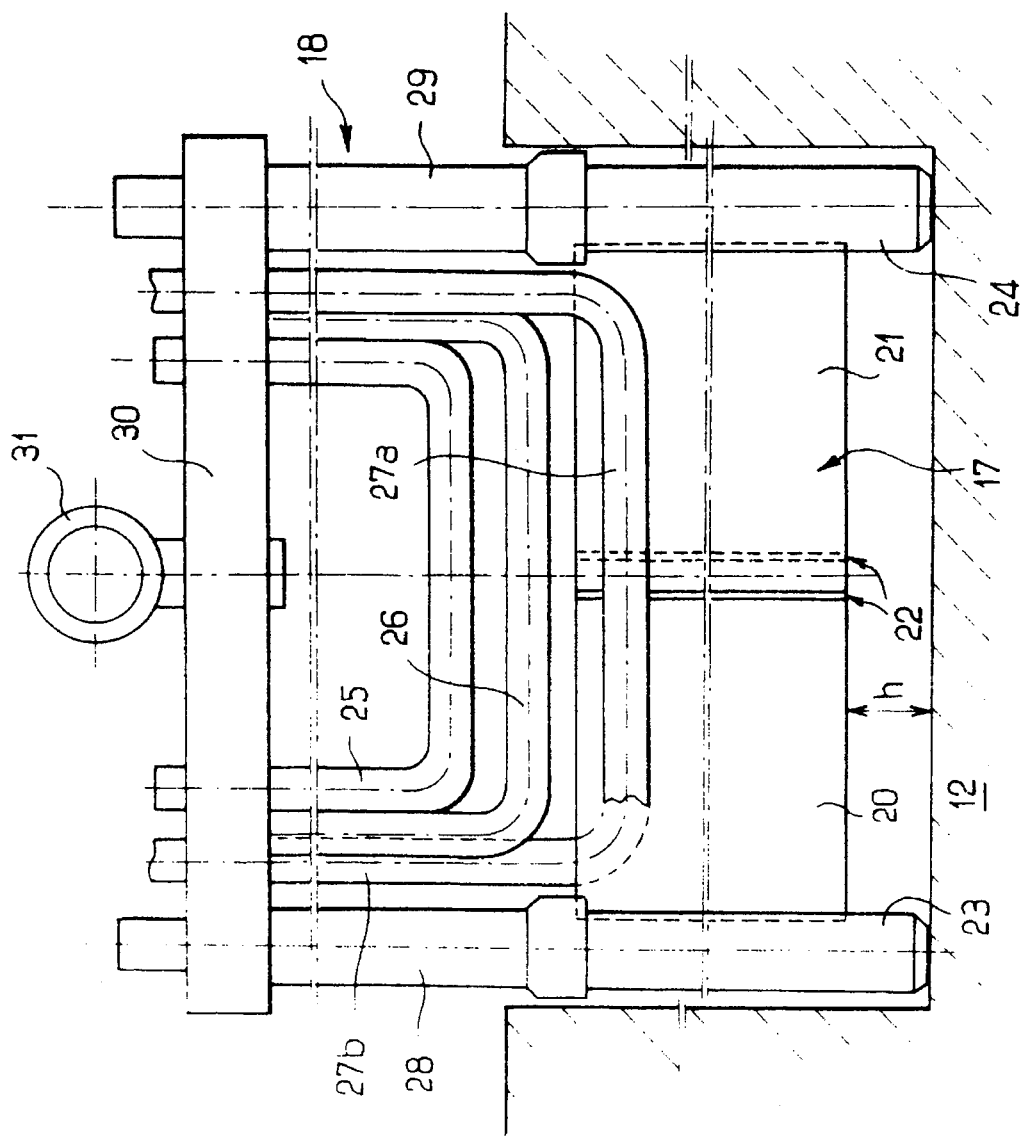

ELECTRIC FURNACE FOR MELTING GLASS

BACKGROUND OF THE INVENTION

1. Field of the Invention

This invention relates to the melting of vitrifiable materials and in particular a process and an electric melting furnace for melting glass obtained by the heat released by the Joule effect.

2. Description of the Related Art

Among the different known types of electric furnaces for melting glass, melting furnaces called cold furnaces or cupola furnaces are furnaces in which the solid composition of vitrifiable materials, supplied from above, forms an upper layer that completely covers the bath of molten glass. The melted glass is removed at the bottom part of the furnace by a throat and then passes into the following cell, which can be a refining cell, then to conditioning process.

One of the problems encountered in this type of furnace, especially when it operates at elevated glass temperatures, on the order of 1500° C., is the rapid wear of the refractories defining the throat, and in particular of the refractories defining the upper part of the throat.

Indeed, despite the use of cooling systems limiting the attack on the refractories by glass at high temperature, these refractories must generally be replaced more quickly than other refractory elements of the furnace. Such a replacement requires stopping the furnace or, at least when possible, a repair while it is hot, involving stopping production.

In addition, the refractory parts constituting the crown of the throat generally have limited maximum dimensions such that the cross section of the throat itself has limited dimensions. The result, for a furnace that uses such a throat as a discharge opening for removing the melted glass, is a limited load capacity generally not exceeding 200 tons/day.

SUMMARY OF THE INVENTION

It is an object of the present invention to eliminate the aforementioned drawbacks.

According to the invention, a furnace for the electric melting of vitrifiable materials, with a cold crown, comprises a melting compartment equipped with electrodes and having an approximately horizontal floor and an outlet in the form of an immersed throat for the removal of the melted glass and moving it into the downstream compartment. The throat is defined, at least at the top part, by a mobile barrier with an upper part extending upward up to a level higher than that of the supernatant composition floating on top of, and covering, the molten glass, and a lower part intended to be totally immersed in the molten glass and having faces made of a metal resistant to corrosion by molten glass.

By mobile, according to the invention, is meant the ability of the barrier to be able to be removed from the furnace without otherwise stopping the operation of the latter. The mobility is advantageously vertical mobility which, notably, is easier to implement than lateral mobility.

According to a preferred form of the invention, the height of the mobile barrier can be adjusted.

By height adjustment, according to the invention, is meant the ability of the same barrier to be placed at a variable level with respect to the level of the lower face of the throat and, because of this, the possibility of making the cross section of the furnace outlet vary.

The metal that is resistant to corrosion by molten glass and that makes up the lower part of the barrier, at least on its faces, and advantageously all the lower part of the barrier in its thickness, is selected in particular from among molybdenum, tungsten, platinum containing rhodium or a metal equivalent with respect to mechanical resistance and to corrosion by molten glass. Preferably, elements made of molybdenum are chosen, in particular for cost reasons.

The end of the outlet which, according to the invention, uses a mobile barrier and is advantageously adjustable, makes it possible not only to increase the lifetime of the furnace, but also makes possible a remarkable adaptability of the furnace to a modification in melting rate and/or to a modification in the glass composition.

By the selection of the material that constitutes at least the faces of the lower part of the barrier, the latter exhibits an increased lifetime and makes possible, for this whole period, good operation of the furnace without interruption.

Due to its mobility, it is possible to remove the barrier and to replace it with an equivalent barrier in several hours, and therefore to limit the loss of glass due to this replacement.

This loss of glass can even be totally avoided by providing two successive barrier positions adjacent to one another. With such a design, a second barrier, identical to the first one, can be installed before removing the first one.

According to one embodiment of the lower part of the barrier, the latter consists of at least one metal plate coated with a sufficiently thick layer of molybdenum and preferably of at least one plate made entirely of molybdenum.

To resolve the problem of expansion of this material at high temperature, it is advantageous to make the lower part with two molybdenum plates overlapping laterally at the center of the barrier to withstand the flow of glass and with sufficient clearance to be able to absorb the expansion of the metal.

The metal plate or plates can have a thickness between about 5 and 50 millimeters. This thickness must be sufficient to avoid too great a deformation of the barrier.

To reduce this deformation still more and, more generally, to reinforce the structure of the lower part of the barrier when the latter is made of at least one metal plate, it can be advantageously to design the barrier with thicker lateral ends, i.e., thicker sides. Thus the lower part can be provided on its two sides with cylinders having diameters greater than the thickness of the plate or plates, in which the side or sides of the metal plates are partially embedded, and with sufficient clearance to allow for expansion.

These cylinders that constitute the lateral ends of the lower part of the barrier can be, at least in their upper part, internally cooled, which has the advantage of preventing the passage of glass between the lateral sides of the barrier and the lateral walls of the throat and also of shielding these lateral walls against rapid corrosion.

In a variant according to the invention, the lower part of the barrier can be made by an assembly of joined vertical cylinders having a diameter generally greater than 50 mm, made of a metal resistant to corrosion by molten glass, which advantageously is molybdenum.

The upper part of the barrier integrally connected to the lower part normally acts to keep the glass composition at the surface in the melting compartment. It extends upward to a height sufficient to exceed the upper level of the supernatant composition and generally extends downward below the lower of this supernatant composition. It is made, according to one embodiment of the barrier, by at least one refractory block approximately in the shape of a parallelepiped. Such refractory blocks can be provided with interior cooling means.

This upper part is further equipped with means such as hooks or other gripping means used to provide the vertical mobility of the barrier and its removal, if need be.

In a variant according to the invention, the upper part of the barrier is made of cooling elements, for example superposed U-shaped cooling tubes whose bases, arranged approximately horizontally, constitute the middle zone of the upper part of the barrier, the one that extends on both sides of the plane of the solid supernatant composition.

These cooling tubes can be made of refractory steel, stainless steel, mild steel, or another metal alloy. They can be protected by metal plates or, in a variant, by a coating that can be a vitrifiable paint or an enamel.

A preferred form of the barrier according to the invention combines a lower part consisting of at least two molybdenum plates that are partially overlapping and bounded by two end cylinders forming the two lateral sides of the barrier, also made of molybdenum. On top of these two cylinders are cooling cylinders that belong to the upper part of the barrier and that surround U-shaped cooling conduits carrying water, for example, and that constitute the other elements of the upper part. These cylinders and cooling conduits can be made of refractory steel or of stainless steel, for example. The molybdenum plates are held by support parts resting on elements of the upper part of the barrier.

The cooling of the cylinders that form the lateral sides of the barrier makes it possible to assure fluidtightness with the lateral refractory walls of the throat and thus to avoid leakage of the glass between the barrier and the refractory walls.

According to an advantageous embodiment of the invention, the cylinders constituting the lateral ends of the barrier comprise two cooling circuits that are independent of one another. A first or interior circuit penetrates up to near the lower end of the cylinders and enhances the mechanical rigidity of the unit. The second or exterior circuit, placed primarily in the upper part of the barrier and ending at about the level of the separation between the upper and lower part of said barrier, helps to solidify the glass between the barrier and the lateral walls of the furnace outlet.

The barrier is equipped with gripping means used for its mobility, which advantageously is a vertical mobility, its adjustment and its removal, if need be.

If the two lateral cylinders extend downward beyond the lower limit of the two plates, they can then, by resting directly on the lower face of the throat, naturally define the height by which the glass passes under the plates.

The upper part of the barrier can further be protected from the supernatant composition by a refractory element not connected to the barrier and placed in front of this upper part. The refractory element is immersed in the tank to a depth corresponding to at least a part of the thickness of the supernatant composition. Thus, in case the barrier is removed and when there is no place to install a second barrier before removal of the first, the composition can be partially blocked by the refractory element.

The lower face of the throat is advantageously made of a refractory that can be located in the extension of the furnace floor or advantageously placed at a level higher than the level of the floor.

When the lower face is at a level higher than the level of the floor, it is possible to use a lower and more economical barrier for an outlet opening of a given height.

The barrier is generally placed vertically and perpendicular to the lateral walls of the throat, although a position inclined in relation to these walls would also be possible.

The invention also relates to a process for electrically melting vitrifiable materials, in which the solid composition of vitrifiable materials is supplied above the mass of molten glass, where it forms an upper layer that completely covers the molten glass and in which the melted glass is removed by a throat or opening whose length and height are reduced in cross section, this opening being adjustable in height depending on the load and/or type of glass composition.

According to an advantageous characteristic of the process, the outlet opening of the melted glass is placed about at midheight of the height of the mass of molten glass.

Another advantage of the barrier according to the invention, connected to its mobility and its easy replacement, is that it permits the furnace to operate, if need be, at melting temperatures higher than the temperatures usually used for the same glass composition in a furnace equipped in the conventional manner with an outlet throat made of refractories. By melting at high temperature, for example about 1550° C., for a soda-lime-silicate glass, it is possible to eliminate any subsequent refining operation and to go directly from the melting compartment to the duct for transferring the melted glass to the shaping station.

The invention further relates to the barrier with its above-described characteristics as an element defining the passage between two compartments in a glass melting furnace. By compartment is meant any part of a furnace that feeds the glass shaping device. This can be the compartment where the melting itself is performed, a refining compartment, a conditioning compartment, or even a duct.

The barrier according to the invention can be used to define at least the upper part of the throat of the furnace outlet as described above. It can also be used advantageously at each point where it is necessary to define a passage for the molten glass and in any applications where its mobility and its ease of replacement can advantageously be fully used. The definition performed by the barrier can be achieved for the upper part of the passage or for the lower part or even for both parts, the barrier then having an opening placed between its bottom part and its top part to assure passage of the molten glass.

The barrier can also be used advantageously to define at least the upper part of the throat of the outlet of a furnace operating at a glass discharge temperature at the throat higher than 1450° C.

BRIEF DESCRIPTION OF THE DRAWINGS

Other characteristics and advantages of the invention come out in the following description of embodiments according to the invention made with reference to the drawings.

FIG. 1 is a view in cross section and in elevation of a furnace according to the invention;

FIG. 2 is a plan view of the furnace shown in FIG. 1;

FIG. 3 is a front view in elevation of an embodiment of the barrier according to the invention;

FIG. 4 is a side view of the barrier shown in FIG. 3;

DETAILED DESCRIPTION OF THE PREFERRED EMBODIMENT

Figure 5:
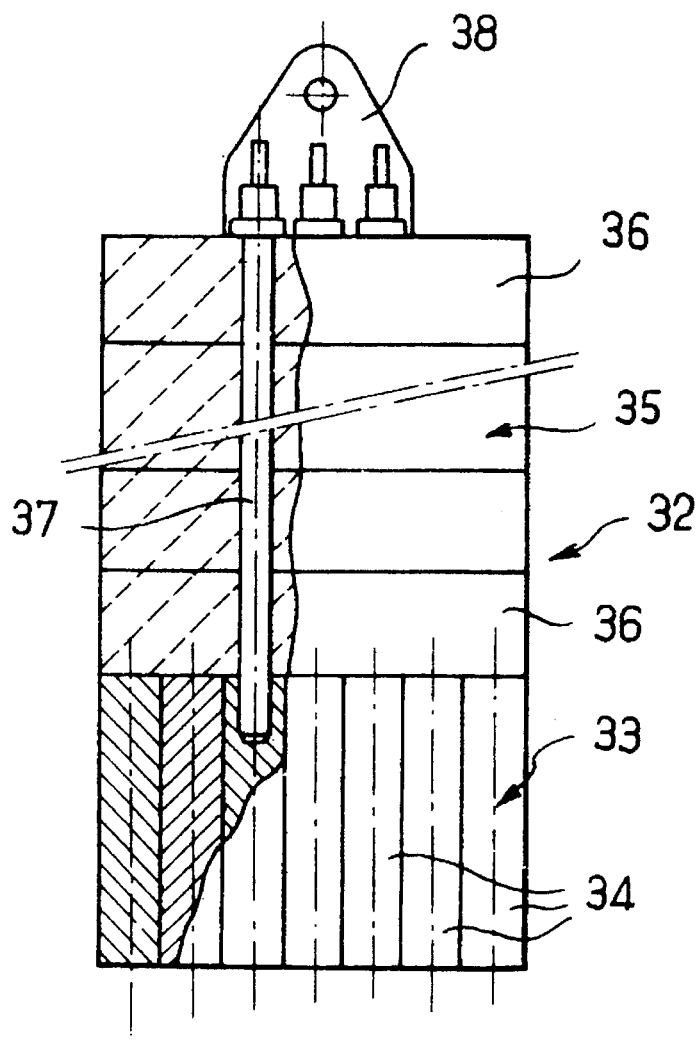
FIG. 5 is a front view in elevation of a variant of the barrier according to the invention.

FIGS. 1 and 2 illustrate an embodiment of a cupola or cold furnace according to the invention. This furnace comprises a melting tank 1 defined by refractory walls 2, 3, 4, 5 and a refractory floor 6 through which pass vertical electrodes 7 installed in two rows of 3 electrodes. These electrodes are connected to an electric power supply, not shown, to assure an approximately uniform dissipation of energy by the electrodes. The temperature of the molten glass bath can thus be regulated to a practically identical value from one region to the next. Composition 8 of vitrifiable materials is supplied on the top of the furnace by a distributor, not shown, and it forms a supernatant layer 9 floating on top of the molten glass. Melted molten glass 10 is removed from tank 1 via an immersed throat 11 defined at the bottom part by a sill 12 placed at a level higher than that of the floor 6, laterally by two vertical walls 13, 14 also belonging to a downstream compartment 15, and at the top part by a mobile barrier 16 which can be adjusted in height. The melted glass flows according to the arrows shown in the figures. This barrier 16, described in more detail below, comprises a lower part 17 intended to be totally immersed in the molten glass and an upper part 18 intended to block the supernatant layer floating on top of the composition of vitrifiable materials, if need be in combination with a refractory element 40 placed just upstream thereof. The upper part is provided with means 19 for connecting it to a system providing vertical mobility and removal of the barrier.

FIGS. 3 and 4 show an embodiment of a barrier according to the invention. This barrier, shown in a normal operating position in relation to the other elements of the throat, comprises a lower part 17 consisting of two plates 20, 21 made of metal resistant to corrosion by molten glass, in particular of molybdenum, partially overlapping laterally at the center of the barrier to define clearances 22 allowing for expansions. They are held by support parts 41 (not shown in FIG. 3) resting on elements of the upper part of the barrier, for example on two cooling conduits 27a, 27b, described below and they traverse plates 20, 21.

These plates 20, 21 are partially embedded, with a clearance allowing for expansions, in two cylinders 23, 24 forming the two lateral sides of the barrier. These two cylinders 23, 24, made of a metal resistant to corrosion by molten glass, in particular molybdenum, are surmounted by cylindrical elements 28, 29, that constitute the lateral sides of the upper part of the barrier. The lateral cylinders are provided with two cooling circuits, not shown. An external circuit extends primarily in the upper part of the barrier and acts to reduce the corrosion of lateral refractory walls 13, 14 of the throat and to solidify the glass between these walls and the barrier. An internal circuit extends essentially over the entire height of the barrier and acts to enhance the mechanical rigidity of the unit.

These two lateral cylinders 23, 24 extend downward beyond the lower level of two plates 20, 21 and can rest on lower face 12 of the throat and thus define height h and width for the passage of the glass under the plates 20, 21. This height h can be, for example, 40 mm to 200 mm, depending on the width of passage and the furnace load or melting rate.

Upper part 18 of the barrier is made from generally U-shaped cooling conduits 25, 26, 27a, 27b arranged one above the other and whose horizontal bases form the center part of the upper part of the barrier. These conduits are placed between cylindrical elements 28, 29 forming the upper lateral part of the barrier and which surmount the two lateral molybdenum cylinders 23, 24 forming the lower lateral part of the barrier.

Lower conduits 27a, 27b cover the highest part of the molybdenum plates on both faces. They can then be used for support of support parts 41 of the molybdenum plates.

The upper ends of the lateral cylinders and the cooling conduits are connected by a cross bar 30 equipped with a hooking element 31 making it possible to raise the barrier or keep it in working position when cylinders 23, 24 no longer rest on lower face 12 of the throat.

The lower part of the barrier, in particular when it is made of two molybdenum plates, exhibits very good resistance to corrosion by molten glass. The upper part, due to its cooling conduits that solidify the supernatant composition and the glass, also exhibits very good resistance. Thus, the barrier described above can be used continuously for several months and provides openings that can vary in height h for the glass to pass through.

After several months of operation and before corrosion has gotten very far, the barrier can be easily removed from the furnace and replaced by an equivalent barrier. To facilitate such removal, the cooling in the external cooling circuit of the lateral cylinders, intended to solidify the glass at least on the sides of the barrier, is first stopped. The replacement operation is very quick and the glass production operation is disrupted for only a period limited to a few hours.

As a variant, a second barrier position can be provided near the first. In this case, the second barrier can be installed before removal of the first. Then the production of glass is generally not disrupted or the disruption lasts only for a very limited period.

Figure 6:
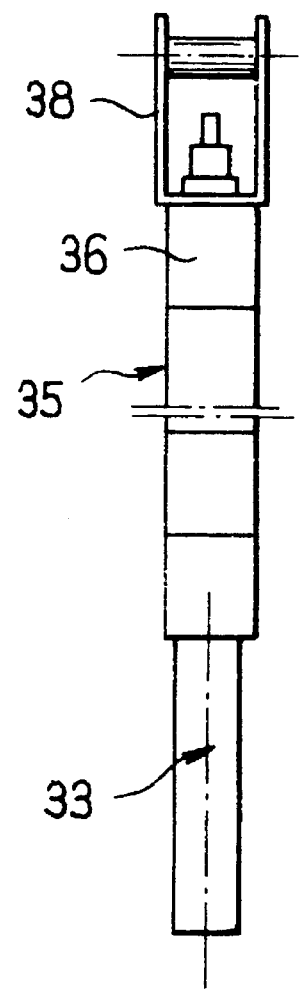
FIG. 6 is a side view of the barrier shown in FIG. 5.

FIGS. 5 and 6 show a variant of a barrier 32 according to the invention. In this variant, lower part 33 of the barrier is made of vertical cylinders 34, for example 7 cylinders, made of metal resistant to corrosion by molten glass, in particular of molybdenum, assembled to one another.

An upper part 35 consists of refractory blocks 36 forming a parallelepiped unit. The blocks are vertically perforated for the passage of cooling conduits 37. Upper part 35 is equipped with means 38, e.g., a bracket, making it possible to grip the barrier, move the barrier or adjust its level with respect to the removal opening.

The several examples of the barrier according to the invention described above are not limiting in any way. other variants of mobile barriers, exhibiting an upper part and a lower part, each of them having the functions described above to perform, are within the scope of the invention.

What is claimed as new and is desired to be secured by Letters Patent of the United States is:

1. A furnace for electric melting of vitrifiable materials, comprising:

a compartment having an approximately horizontal floor and an outlet;

an electric heating device positioned for heating and melting glass in said compartment, the molten glass including a supernatant composition; and an immersed throat at the outlet for removing the melted glass, wherein at least an upper part of the throat is defined by a mobile barrier having an upper part extending upward up to a level higher than that of the supernatant composition and a lower part constructed so as to be totally immersed in the molten glass, said lower part comprising at least two plates having metallic faces resistant to corrosion by molten glass, wherein said at least two plates of said lower part of the barrier partially laterally overlap with sufficient clearance to absorb thermal expansion of the barrier.

2. Furnace according to claim 1, including means for adjusting a height of said mobile barrier.

3. Furnace according to claim 1, wherein the faces of said lower part of said barrier are comprised of at least one metal from the group consisting of molybdenum, tungsten, platinum containing rhodium, and alloys thereof.

4. Furnace according to claim 3, wherein the at least two plates of the lower part of the barrier is made primarily of molybdenum.

5. Furnace according to claim 4, wherein the lower part of the barrier is made primarily of at least two molybdenum plates.

6. Furnace according to claim 1, wherein the upper part of the barrier comprises a refractory material.

7. Furnace according to claim 1, wherein the upper part of the barrier comprises at least one cooling element.

8. Furnace according to claim 7, wherein the upper part of the barrier comprises cooling tubes.

9. Furnace according to claim 8, wherein the upper part of the barrier comprise at least two superposed, parallel, U-shaped cooling tubes whose horizontal bases form an upper, center part of the barrier.

10. Furnace according to claim 7, wherein the at least one cooling element is made of steel.

11. Furnace according to claim 10, wherein the at least one cooling element is protected by one of a metal plate and a coating selected from among the group consisting of a vitrifiable paint and an enamel.

12. Furnace according to claim 1, wherein lateral ends of the barrier, at least in said lower part, are comprised by two cylinders in which said at least two plates are partially embedded with sufficient clearance to allow for expansion of said at least two plates.

13. Furnace according to claim 12, including additional cylinders comprising lateral ends of the upper part of the barrier and surmounting the two cylinders comprising lateral ends of the lower part of the barrier.

14. Furnace according to claim 13, wherein the two and the additional cylinders have means for cooling at least the upper part of the barrier.

15. Furnace according to claim 14, wherein said cooling means of said cylinders comprise two independent cooling circuits.

16. Furnace according to claim 1, wherein the lower part of the throat is defined by a sill located at a level above that of the furnace floor.

17. A furnace for electric melting of vitrifiable materials, comprising:

a compartment having an approximately horizontal floor and an outlet;

an electric heating device positioned for heating and melting glass in said compartment, the molten glass including a supernatant composition; and an immersed throat at the outlet for removing the melted glass, wherein at least an upper part-of the throat is defined by a mobile barrier having an upper part extending upward up to a level higher than that of the supernatant composition and a lower part constructed so as to be totally immersed in the molten glass, said lower part comprising at least one plate having metallic faces resistant to corrosion by molten glass, wherein the upper part of the barrier comprises at least two superposed, parallel, U-shaped cooling tubes external to said at least one plate and having horizontal bases extending to said lower part of the barrier so as to cover and reinforce said at least one plate.

18. The furnace of claim 17 wherein said upper part of the barrier comprises additional U-shaped cooling tubes having horizontal bases in said upper part of the barrier and forming a cooling circuit independent of said at least two superposed, parallel, U-shaped cooling tubes having horizontal bases extending to said lower part of the barrier.

19. The furnace of claim 17, wherein said at least one plate comprises two plates which partially laterally overlap with sufficient clearance to absorb thermal expansion of the barrier.

20. A furnace for electric melting of vitrifiable materials, comprising:

a compartment having an approximately horizontal floor and an outlet;

an electric heating device positioned for heating and melting glass in said compartment, the molten glass including a supernatant composition; and an immersed throat at the outlet for removing the melted glass, wherein at least an upper part of the throat is defined by a mobile barrier having an upper part extending upward up to a level higher than that of the supernatant composition and a lower part constructed so as to be totally immersed in the molten glass, said lower part comprising two lateral cylinders and at least one plate extending between said lateral cylinders, wherein lower ends of said lateral cylinders extend below a lower end of said at least one plate such that the lower ends of said lateral cylinders rest on a lower face of said throat to define a height for passage of molten glass between the lower end of said at least one plate and the lower face of said throat.

21. The furnace of claim 20 wherein said lower ends of said lateral cylinders extend below the lower end of said at least one plate by at least 40 mm.

* * * * *